(12) United States Patent
Iyer

(10) Patent No.: US 11,537,883 B2
(45) Date of Patent: Dec. 27, 2022

(54) METHOD AND SYSTEM FOR MINIMIZING IMPACT OF FAULTY NODES ASSOCIATED WITH AN ARTIFICIAL NEURAL NETWORK

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 468 days.

(21) Appl. No.: 16/732,449

(22) Filed: Jan. 2, 2020

(65) Prior Publication Data
US 2021/0150339 A1    May 20, 2021

(30) Foreign Application Priority Data
Nov. 20, 2019  (IN) .............................. 201941047353

(51) Int. Cl.
G06N 3/08 (2006.01)
G06N 3/04 (2006.01)
G06N 3/063 (2006.01)

(52) U.S. Cl.
CPC ............... *G06N 3/08* (2013.01); *G06N 3/04* (2013.01); *G06N 3/063* (2013.01)

(58) Field of Classification Search
CPC ............ G06N 3/08; G06N 3/04; G06N 3/063; G06N 3/06; G06N 3/0481; H04L 45/08; H04L 45/125; H04L 45/28
See application file for complete search history.

(56) References Cited

U.S. PATENT DOCUMENTS

| 5,146,460 A | 9/1992 | Ackerman et al. |
| 9,064,216 B2 | 6/2015 | Reddy et al. |
| 2017/0161609 A1* | 6/2017 | Wood .................... H04L 45/121 |
| 2017/0337468 A1* | 11/2017 | Bruestle .................. G06N 3/04 |

FOREIGN PATENT DOCUMENTS

WO    2017127763 A1    7/2017

OTHER PUBLICATIONS

Khalil et al. "Self-Healing Approach for Hardware Neural Network Architecture", Oct. 31, 2019 https://ieeexplore.ieee.org/document/8885235?source=IQplus (Year: 2019).*

* cited by examiner

*Primary Examiner* — Yogeshkumar Patel
(74) *Attorney, Agent, or Firm* — Finnegan, Henderson, Farabow, Garrett & Dunner, LLP

(57) ABSTRACT

A technique is provided for minimizing impact of a faulty node associated with an artificial network. The technique includes detecting a faulty node associated with the artificial neural network. The faulty node causes a faulty path in the artificial neural network. Further, a plurality of alternate paths are identified to reroute the faulty path. Based on the identified plurality of alternate paths, the faulty path is rerouted by assigning one or more weights associated with the faulty node to one or more nodes associated with the plurality of alternate paths.

13 Claims, 9 Drawing Sheets

Rerouting system 104

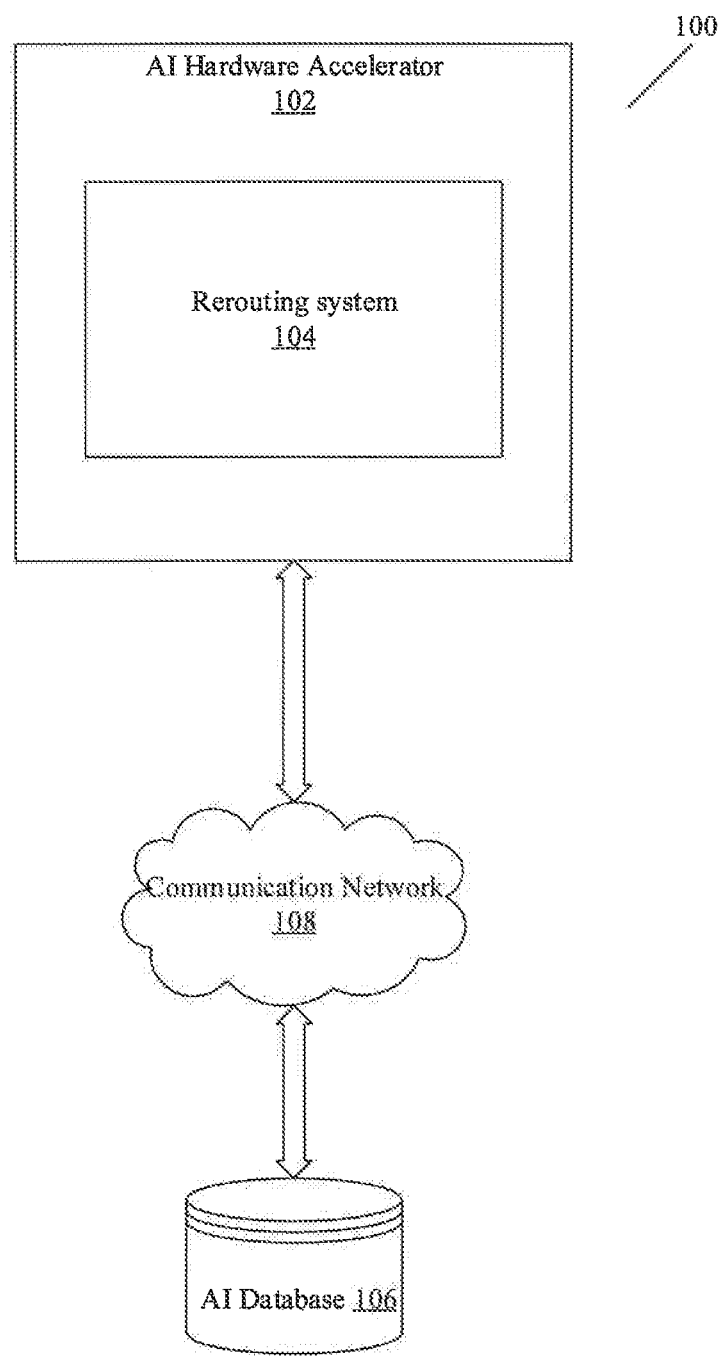
FIG. 1: Network Environment 100

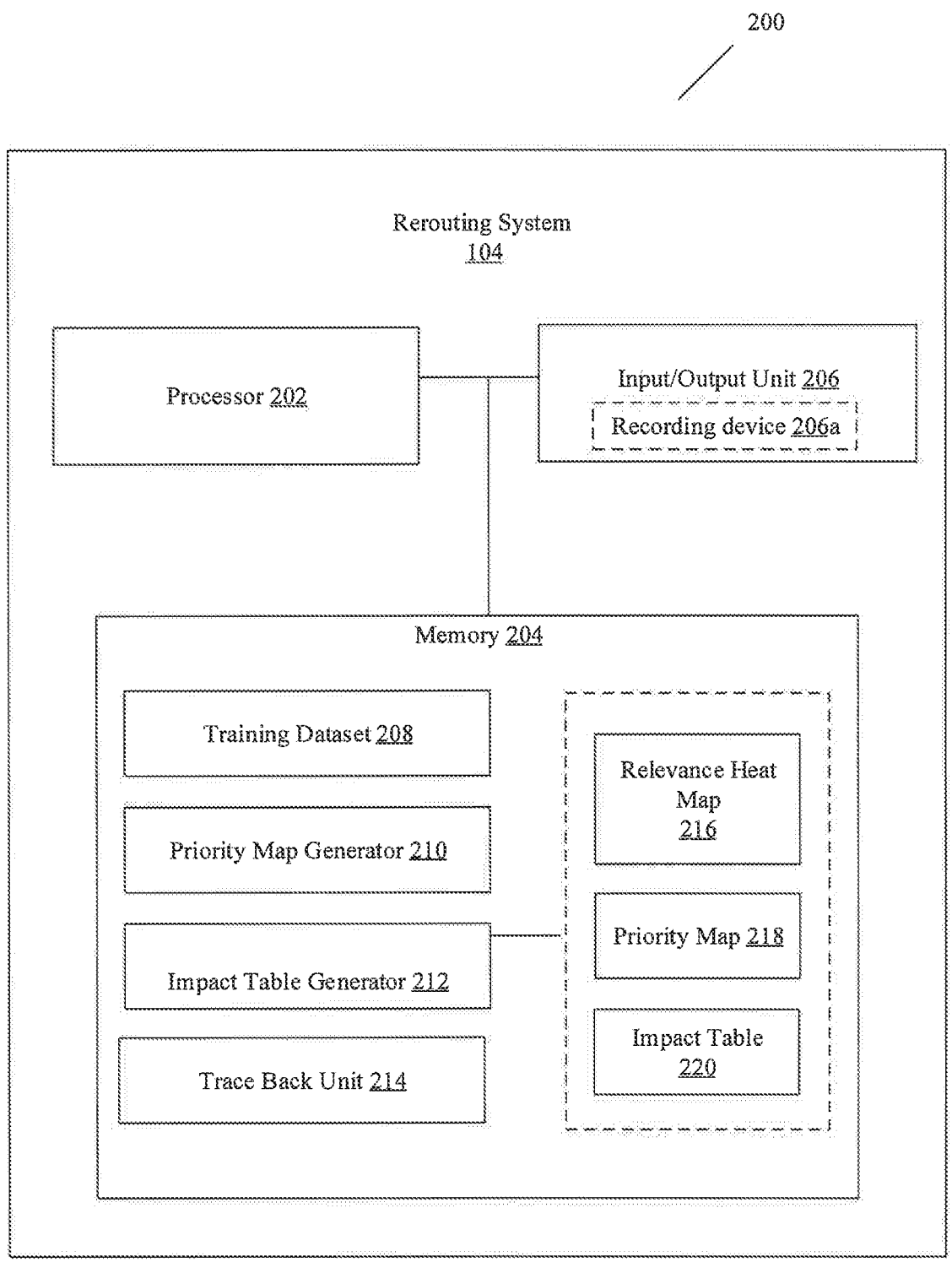
FIG. 2: Rerouting system 104

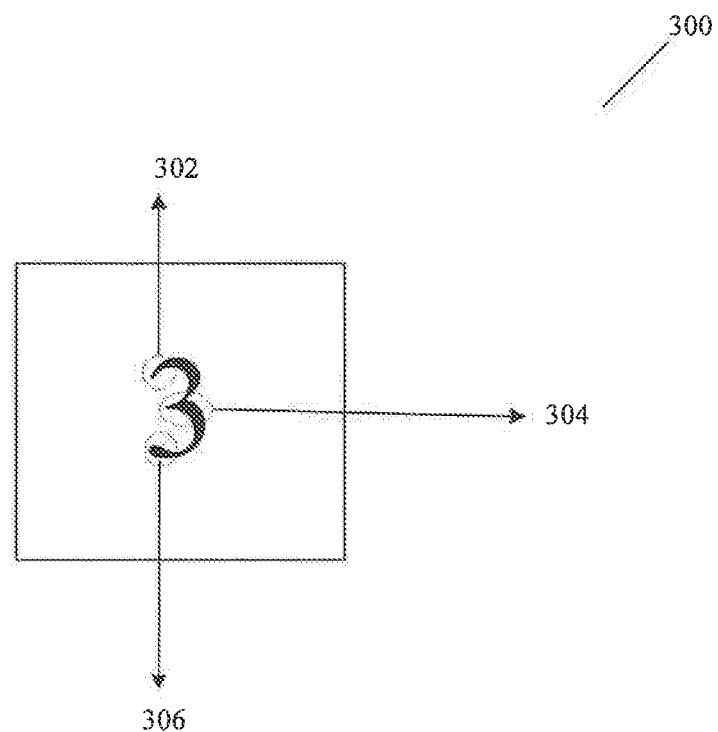
FIG. 3A: Exemplary relevance heat map 300

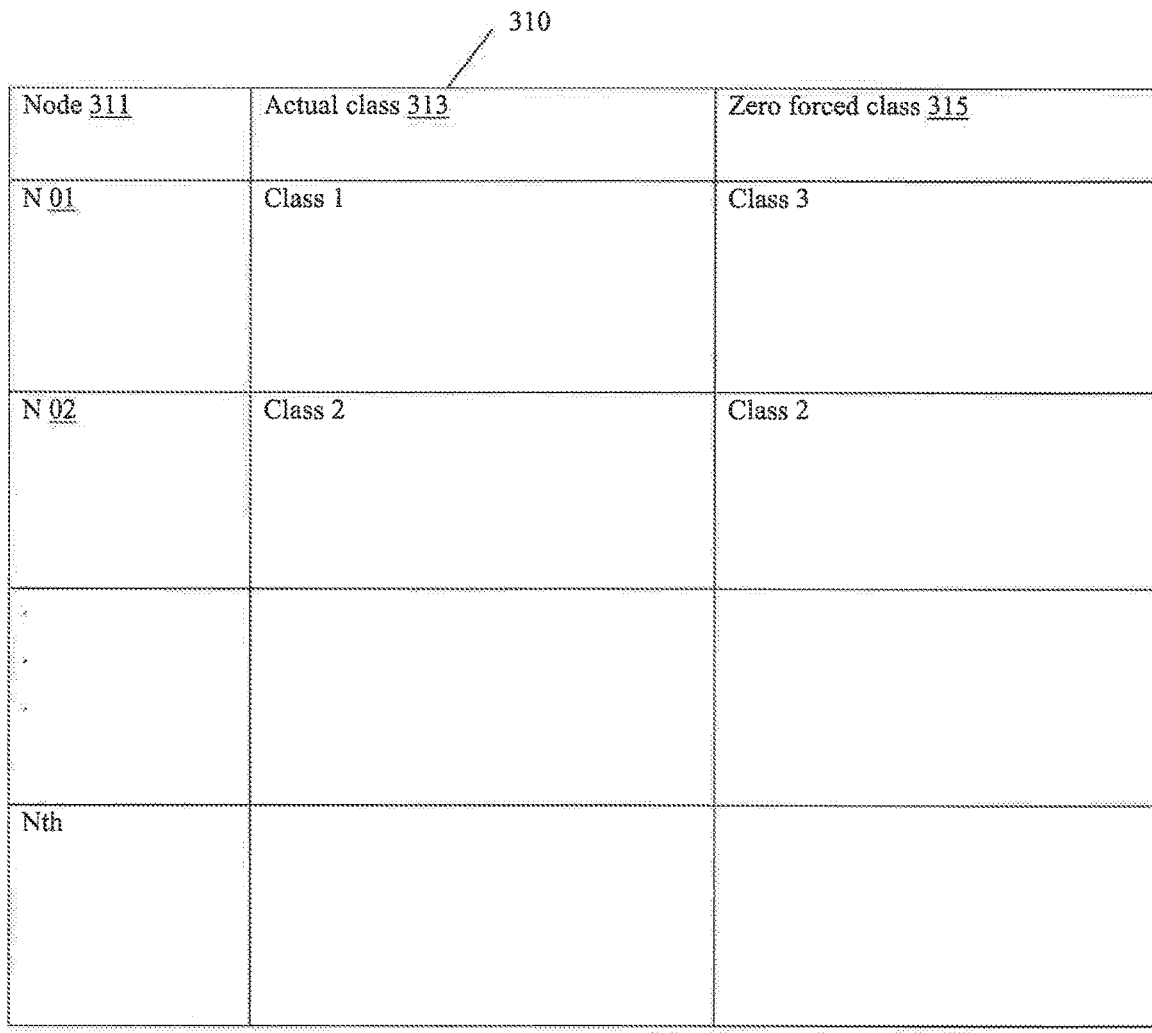
FIG. 3B: Impact table 310 for recording change in classification

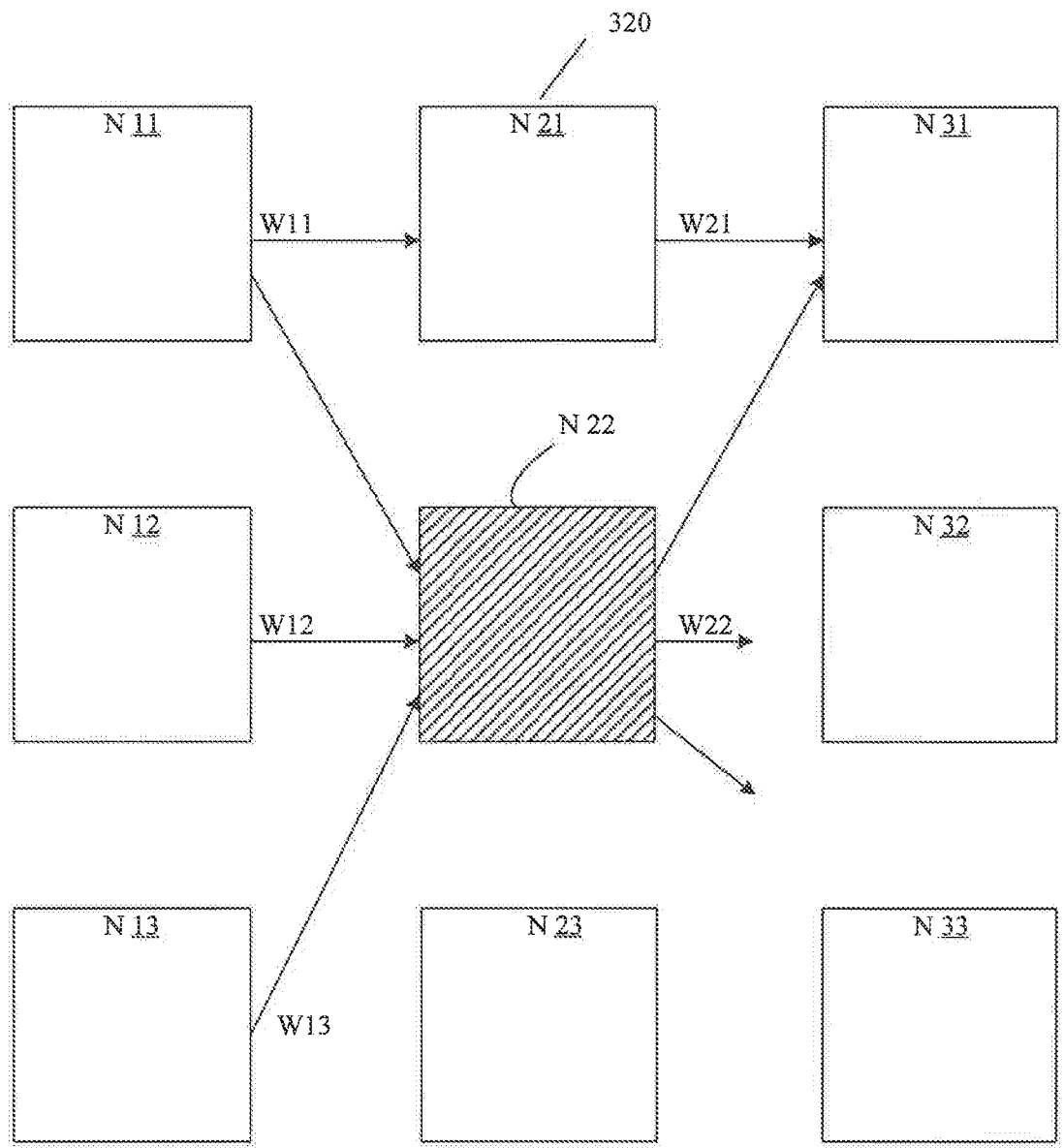
FIG. 3C: Network connectivity 320 around a faulty node

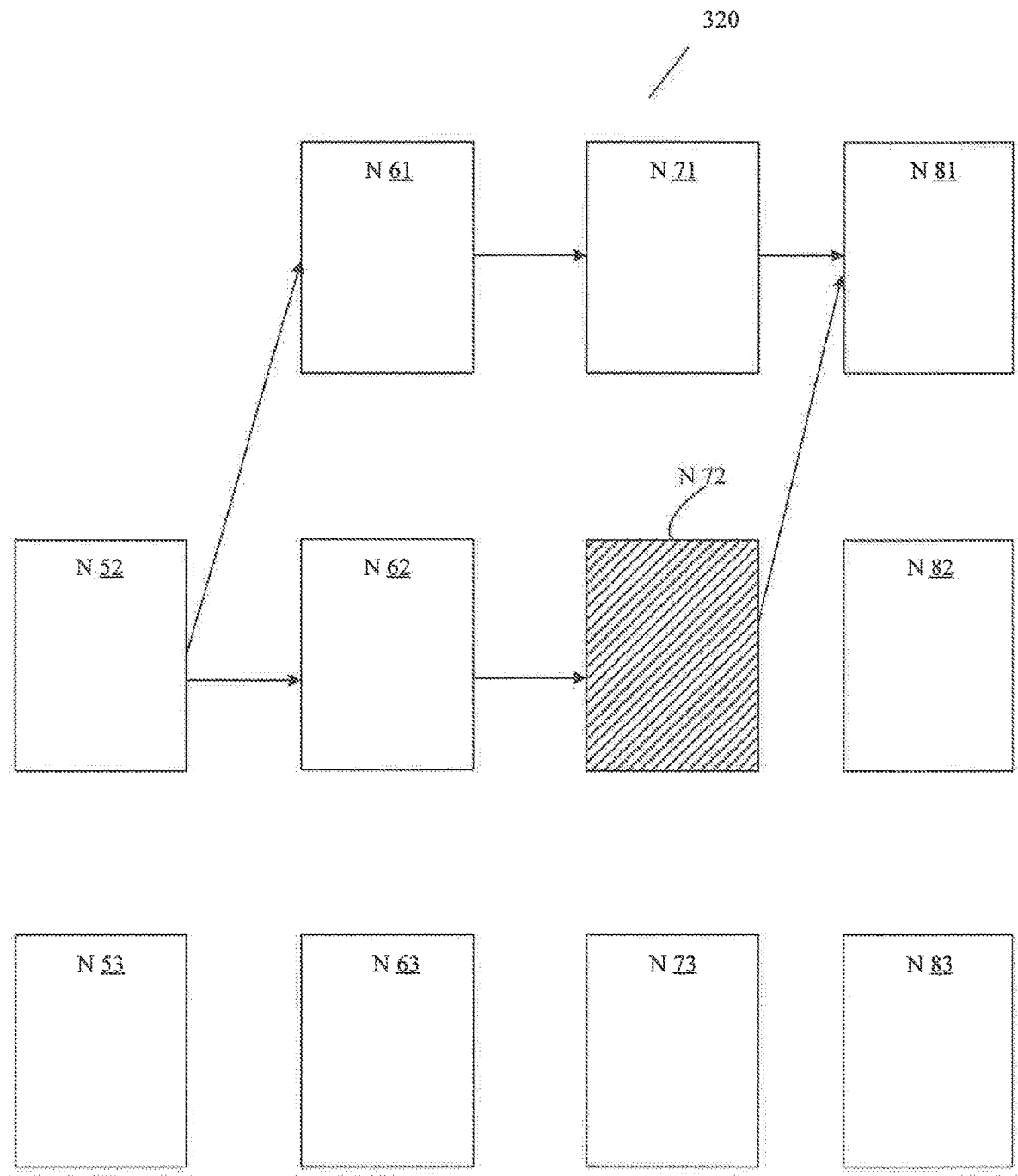
FIG. 3D: Network connectivity 330 around a faulty node

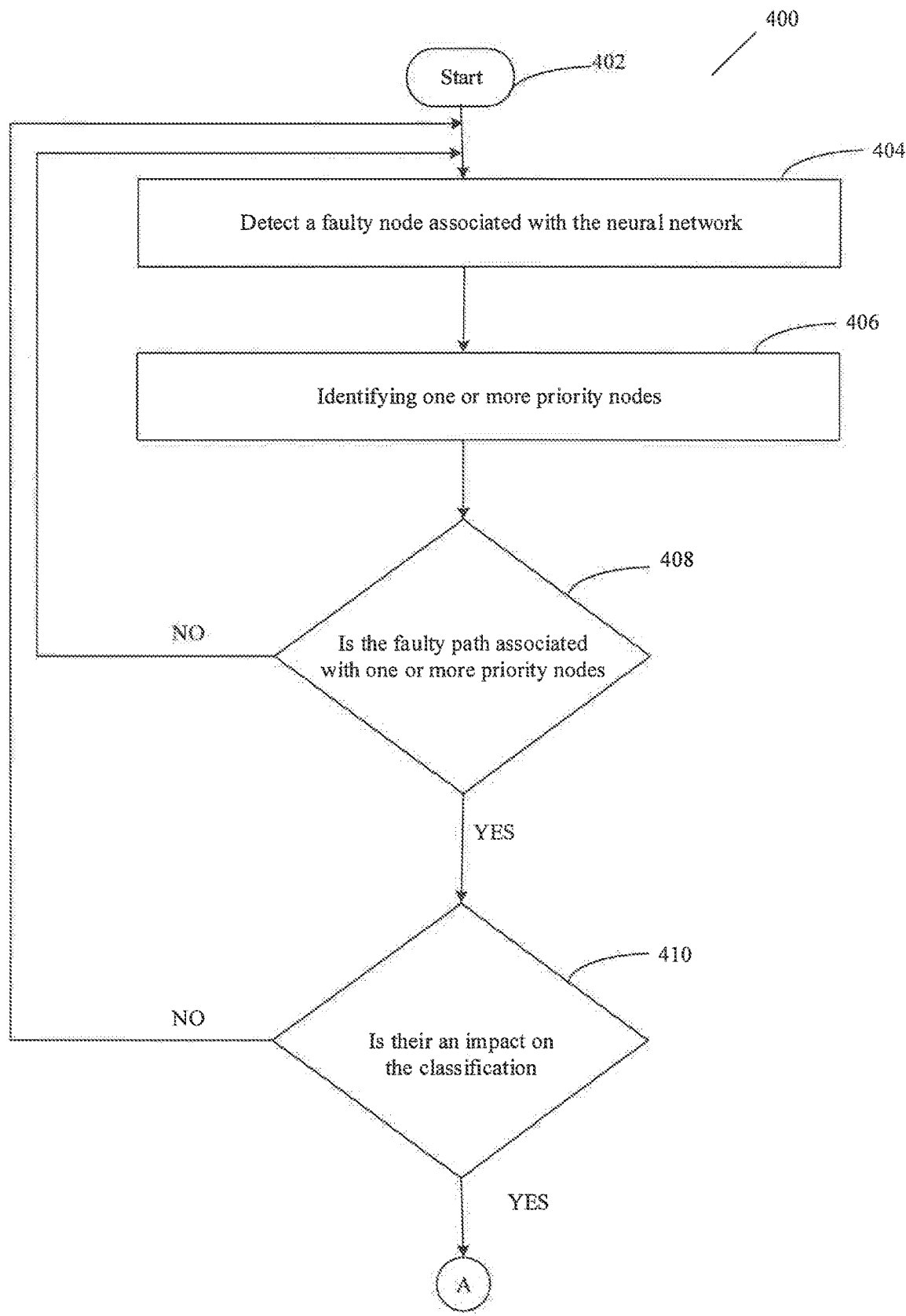
FIG. 4A: Method 400 for minimizing impact of faulty nodes

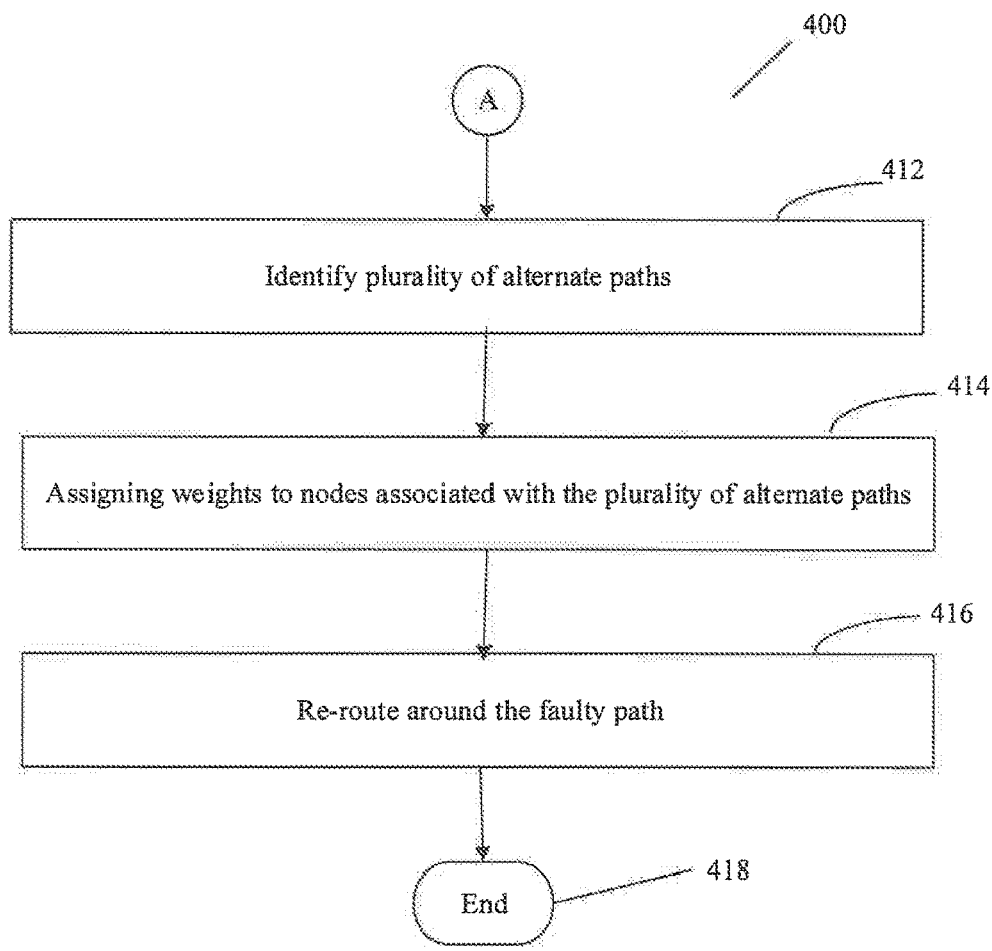
FIG. 4B: Method 400 for minimizing impact of faulty nodes

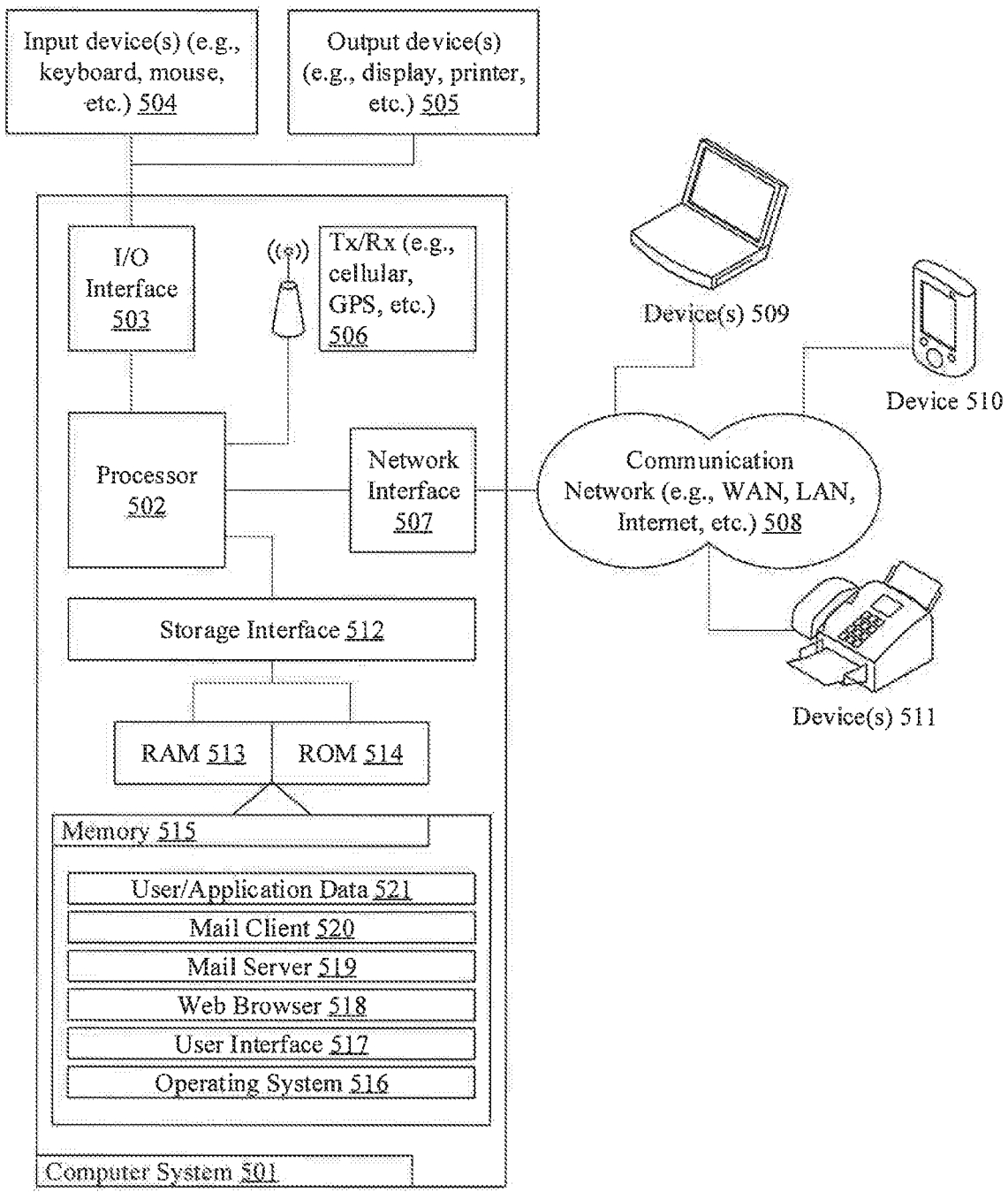
FIG. 5: Example Computer System

US 11,537,883 B2

METHOD AND SYSTEM FOR MINIMIZING IMPACT OF FAULTY NODES ASSOCIATED WITH AN ARTIFICIAL NEURAL NETWORK

TECHNICAL FIELD

This disclosure relates to the field of artificial neural network and more particularly to a method and system for rerouting around a faulty node in an artificial neural network.

BACKGROUND

Neural networks are widely used for various Artificial Intelligence (AI) applications including classification, recognition, prediction, etc. Neural network makes use of multiple layers of neurons for accurate decision making. The behavior of the neural network is defined by the way its individual neurons are connected and by the strength, or weights, of those neurons. These weights are automatically adjusted during training according to a specified learning rule until the neural network performs the desired task correctly.

The neural network delivers state-of-the-art accuracy on many AI tasks, but it comes at the cost of high computational complexity. As the size of the neural network increases, there is complexity in terms of storage requirements for the weights. They also start throwing inaccurate results when one or more neurons go faulty especially on the hardware implementation.

It is therefore desirable to provide a mechanism for rerouting the faulty path taken by the neural network for performing the desired task.

SUMMARY

In one embodiment, a method of minimizing impact of a faulty node associated with an artificial neural network is disclosed. In an example, the method comprises detecting a faulty node associated with an artificial neural network based on testing the artificial neural network periodically with a training dataset. The detected faulty node causes a faulty path in the artificial neural network. Further, the method comprises identifying a plurality of alternate paths to reroute the faulty path. The plurality of alternate paths is identified based on at least one network connection between one or more upstream nodes of the faulty node and one or more downstream nodes of the faulty node. The method further comprises rerouting the faulty path by assigning one or more weights associated with the faulty node to one or more nodes associated with the plurality of alternate paths.

In another embodiment, a system is disclosed for minimizing impact of a faulty node associated with an artificial neural network. The system comprises a processor and a memory communicatively coupled to the processor. The memory stores processor-executable instructions, which, on execution, cause the processor to detect a faulty node associated with an artificial neural network based on testing the artificial neural network periodically with a training dataset. The faulty node causes a faulty path in the artificial neural network. The processor-executable instructions, on execution, further cause the processor to identify a plurality of alternate paths to reroute the faulty path. The plurality of alternate paths is identified based on at least one network connection between one or more upstream nodes of the faulty node and one or more downstream nodes of the faulty node. The processor-executable instructions, on execution, further causes the processor further causes the processor to reroute the faulty path by assigning one or more weights associated with the faulty node to one or more nodes associated with the plurality of alternate paths.

In yet another embodiment, a non-transitory computer-readable medium storing computer-executable instructions for minimizing impact of a faulty node associated with an artificial neural network is disclosed. In one example, the stored instructions, when executed by a processor, cause the processor to detect a faulty node associated with an artificial neural network based on testing the artificial neural network periodically with a training dataset. The faulty node causes a faulty path in the artificial neural network. The processor-executable instructions, on execution, further cause the processor to identify a plurality of alternate paths to reroute the faulty path. The plurality of alternate paths is identified based on at least one network connection between one or more upstream nodes of the faulty node and one or more downstream nodes of the faulty node. The processor-executable instructions, on execution, further cause the processor to reroute the faulty path by assigning one or more weights associated with the faulty node to one or more nodes associated with the plurality of alternate paths.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1 shows an exemplary network environment 100 for an artificial neural network, in accordance with some embodiments of the present disclosure.

FIG. 2 is a block diagram of a rerouting system for minimizing impact of a faulty node, in accordance with some embodiments of the present disclosure.

FIG. 3A illustrates an exemplary relevance heat map 300.

FIG. 3B illustrates an exemplary impact table 310 for recording change in classification associated with a priority node.

FIG. 3C illustrates an exemplary network connectivity 320 around a faulty node.

FIG. 3D illustrates another exemplary network connectivity 330 around a faulty node.

FIGS. 4A and 4B collectively illustrate a flowchart of an exemplary method for minimizing impact of a faulty node associated with an artificial neural network, in accordance with some embodiments of the present disclosure.

FIG. 5 is a block diagram of an exemplary computer system for implementing embodiments consistent with the present disclosure.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Referring now to FIG. 1, an exemplary system environment 100 for minimizing impact of faulty nodes/neurons associated with an artificial neural network is illustrated, in accordance with some embodiments of the present disclosure. In one embodiment, the system environment 100 includes an AI hardware accelerator 102, a rerouting system 104 and one or more remote network entities, such as an AI database 106 coupled with the AI hardware accelerator 102 via a communication network 108. In particular, the system 100 may implement a rerouting system 104 on an Artificial Intelligent (AI) hardware accelerator 102 to minimize the impact of faulty nodes associates with the artificial neural network in the AI hardware accelerator 102. As will be appreciated, the AI hardware accelerator 102 may be any application specific hardware unit (for example, graphics processing unit, field-programmable gate arrays or the like).

The rerouting system 104 may include suitable logic, circuitry, interfaces, and/or code for minimizing impact of faulty nodes associated with an artificial neural network. The rerouting system 104 may detect a faulty node associated with the artificial neural network. The faulty node causes a faulty path in the artificial neural network. The rerouting system 104 may identify a plurality of alternate paths to reroute the faulty path by assigning one or more weights associated with the faulty node to one or more nodes associated with the plurality of alternate paths. In an implementation, the rerouting system 104 may further include a processor 202, an input/output unit 206, and a memory 204, discussed later in FIG. 2.

The AI database 106 may include suitable logic, circuitry, interfaces, and/or code for storing data and modules. The AI database 106 may store training dataset associated with the AI hardware accelerator 102, predefined response to the training dataset, and structural and functional information related to the AI hardware accelerator 102. Moreover, the AI database 106 may also get auto-updated periodically based on different real-time scenarios.

The communication network 108 may include a medium through which the AI hardware accelerator 102 and AI database 106 present in the network environment 100 may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

In operation, to achieve high-speed computation, the neurons, or nodes associated with the artificial neural network are fabricated over one or more silicon chips. The hardware boards comprising the one or more silicon chips are used as AI hardware accelerators 102 to support computations in real-time. The hardware boards are small in size and may be inserted in any portable device such as mobile phones, cameras, etc. The artificial neural network consists of an input layer, one or more hidden layers, and an output layer. The layers may interconnect via nodes, or neurons, with each layer using the output of the previous layer as its input. Each node performs a task of generating a weighted sum of input provided to the said node and nonlinear transformation of the same. Hence, one or more weights are associated with the nodes in the artificial neural network. Further, in case of any environmental issues, one or more nodes may go faulty. A faulty node may fail to perform its task of generating the weighted sum of the input and nonlinear transformation of the same. As a result, the input provided to the subsequent neurons down the line would get erroneous leading to faulty decisions by the system.

The present disclosure provides a method and a system for minimizing impact of faulty nodes associated with an artificial neural network. The rerouting system 104 may detect a faulty node associated with an artificial neural network based on testing the artificial neural network periodically with a training dataset. The artificial neural network complements a hardware accelerator 102 to achieve high-speed computation and perform a desired task correctly. The faulty node is detected if a predefined response to the training dataset is not received. The faulty node causes a faulty path in the artificial neural network. In some embodiments, the rerouting system 104 may identify a plurality of alternate paths to reroute the faulty path. In some embodiments, the rerouting system 104 may identify a plurality of alternate paths to reroute the faulty path. The plurality of alternate paths is identified based on at least one network connection between one or more upstream nodes of the faulty node and one or more downstream nodes of the faulty node.

FIG. 2 is a block diagram of an exemplary system for minimizing impact of faulty nodes associated with an artificial neural network on a rerouting system 104, in accordance with some embodiments of the present disclosure. FIG. 2 is explained in conjunction with elements from FIG. 1. With reference to FIG. 2, there is shown the rerouting system 104. The rerouting system 104 may include one or more processors, such as a processor 202. The rerouting system 104 may further include a memory 204, and an input/output (I/O) unit 206, The processor 202 may be communicatively coupled to the memory 204, and the I/O unit 206. In an embodiment, the rerouting system 104 may be communicatively coupled to the one or more remote network entities, such as the AI database 106 through the communication network 108.

The processor 202 may include suitable logic, circuitry, interfaces, and/or code that may be configured to execute a set of instructions stored in the memory 204. The processor 202 may be configured to detect a faulty node associated with an artificial neural network of the AI hardware accelerator 102. The processor 202 may identify a plurality of alternate paths to reroute the faulty path in the artificial neural network of the AI hardware accelerator 102. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may include suitable logic, circuitry, and/or interfaces that may be configured to store a machine code and/or a computer program with at least one code section executable by the processor 202. In an embodiment, the memory 204 may be configured to store the functional modules (i.e. detecting the faulty node, identifying the plurality of alternate paths and rerouting the faulty path) and the data related to the neural network such as the training dataset. The stored functional modules may include, but are not limited to training dataset 208, a priority map generator 210, an impact table generator 212, and a trace back unit 214. The processor 202 may be further configured to store data. The stored data may include but are not limited to relevance heat map 216, priority map 218, and impact table 220. In an implementation, Examples of implementation of the memory 204 may include but are not limited to, Random Access Memory (RAM), Read Only Memory (ROM), Hard Disk Drive (HDD), and/or a Secure Digital (SD) card.

The I/O unit 206 may include suitable logic, circuitry, interfaces, and/or code that may be configured to receive realtime data from the AI hardware accelerator 102. The I/O unit 206 may be configured to provide the outcome after rerouting the faulty path to the AI hardware accelerator 102. The I/O unit 206 may include various input and output devices that may be configured to communicate with the processor 202. Further, the I/O unit 206 may be equipped with a recording device 206a for recording the input provided by the AI hardware accelerator 102 and updating the AI database 106 with the input. Examples of implementation of the recording device 206a may include, but are not limited to, a digital camera, a video camera, and/or a motion camera, speech recorder, etc.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description may be considered as exemplary only, with the true scope and spirit being indicated by the following claims.

In operation, the rerouting system 104 may minimize impact of a faulty node associated with an artificial neural network. The artificial neural network may complement an AI hardware accelerator 102 to achieve high-speed computation and perform the desired task correctly. The faulty node may be caused due to any operating environmental issues such as elevated or very low temperature, excessive humidity, usage issues such as power glitches, lightning, solar activities, long hours of service, heat dissipated during deployment, ageing, exposure to stray electric or magnetic fields, mechanical vibrations, etc. The faulty node in the artificial neural network may fail to perform its desired task of generating a weighted sum of the real-time data received by the I/O unit 206 and nonlinear transformation of the same. As a result, the input provided to the subsequent neurons down the line would get erroneous leading to faulty decisions by the artificial neural network.

As an example, an autonomous vehicle may be the AI hardware accelerator 102. In the autonomous vehicle, the desired task of the neural network may be to decide whether to apply brakes or to increase speed of the autonomous vehicle. The faulty node may cause the neural network to increase the speed of the autonomous vehicle instead of applying the brakes when an obstacle is encountered. The error may happen because the classifier that increases the speed/applies the brake turns faulty. In another example, a fruit classifier may be the AI hardware accelerator 102 used to classify rotten fruits and fresh fruits. The faulty node may cause the fruit classifier to pack rotten apples for a customer and discard the fresh apples.

In an embodiment, the rerouting system 104 may receive the training dataset 208 from the memory 204. The training dataset 208 may be stored outside the rerouting system 104 in the AI database 106. A predefined response associated with the training dataset 208 may also be stored in the memory 204. The rerouting system 104 may detect a faulty node if the predefined response to the training dataset 208 is not received when the AI hardware accelerator 102 is deployed in real-time. The faulty node may cause a faulty path in the artificial neural network. The path associated with the faulty node which causes a faulty decision may be referred to as the faulty path.

In an embodiment, the faulty path may be associated with one or more priority nodes. The rerouting system 104 may detect the one or more priority nodes based on a relevance heat map associated with the training dataset 208. The relevance heat map may indicate, which part of the input is important for decision making. The relevance heat map may be generated through at least one of Layer-wise Relevance propagation (LRP) and sensitivity analysis (SA) techniques.

In an embodiment, the AI hardware accelerator 102 may be a video classifier or an image classifier, A subset of relevance heat map may pass through the artificial neural network of the AI hardware accelerator 102. The priority map generator 210 may generate a priority map 218 based on the captured result. The pixels associated with the relevance heat map whose activation passes through the node in consideration and influence the classification may be captured in the priority table. The priority nodes comprises the node, which influence the classification of the image classifier. The priority map 218 may disclose the relevance of a specific neuron in the classification.

In an example FIG. 3A illustrates an exemplary relevance heat map 300 for the classification of number '3', The relevance heat map 300 is passed through the neural network. The relevance heat map 300 of number '3' shows three salient points 302, 304 and 306 which are necessary to classify the number '3.' Further, the priority map 218 is generated based on the relevance heat map 300. In this case, the relevance heat map 300 is fed to the artificial neural network, the priority neurons in each layer (input layer, hidden layer 1, hidden layer 2 and output layer) are marked, as shown in FIG. 3A.

In an embodiment, the rerouting system 104 reroutes the faulty path based on an impact of the one or more priority nodes on classification associated with the artificial neural network. The determination of the impact of the one or more priority nodes may comprise setting one or more weights associated with each priority node to zero successively and recording a change in classification associated with each priority node based on setting one or more priority nodes to zero. The change in classification relates to the impact of each priority node of the one or more priority nodes.

In an embodiment, the processor in configuration with the impact table generator 212 may determine the impact of the one or more priority nodes on classification associated with the artificial neural network. The impact table generator 212 may set one or more weights associated with each priority node to zero successively and record a change in classification associated with each priority node.

FIG. 3B illustrates an exemplary impact table 310 for storing impact of the one or more priority nodes on classification associated with the artificial neural network. The impact table 310 corresponds to the change in class after setting the one or more weights associated with each priority node to zero successively. As an example, in an image classifier, if the weight associated with a priority node is set as zero i.e. the subsequent output from the priority node is zero, it may classify the image erroneously. As shown in row 1 of FIG. 3B, the correct classification (or actual class 313) of the image may be Class 1, but due to setting the weight associated with the priority node N 01 as zero, there is an impact on the classification and the zero forced class 315 is Class 3. In such a case, the rerouting system 104 may reroute the faulty path based on the impact of the one or more priority nodes on classification.

In another example, as shown in row 2 of FIG. 3B, the correct classification (or the actual class 313) of the image may be class 2, and after setting the weight associated with the priority node N 02 as zero, there is no impact on the classification and the zero forced class (315) is still class 2. In such a case, the rerouting system 104 may not reroute the faulty path. There may be as many rows in the impact table as the number of priority nodes in the neural network. The impact table may record the change in classification for all the priority nodes.

In an embodiment, the rerouting system 104 may determine the impact of the one or more priority nodes and record the change in classification associated with each priority node based on setting one or more priority node to zero successively. The rerouting system 104 may further select an alternate path from the plurality of alternate paths to rectify the change in classification and restore the relevance heat map 300 associated with the training dataset 208. The processor 202 in configuration with the trace back unit 214 may identify a plurality of alternate paths. The plurality of alternate paths are identified based on at least one network connection between one or more upstream nodes of the faulty node and one or more downstream nodes of the faulty node.

FIG. 3C illustrates exemplary network connectivity 320 around the faulty node. The node N 22 in the FIG. 3C may depict a faulty node. The upstream nodes of N 22 may comprise N 11, N 12, N 13, etc. and the downstream nodes of N 22 may comprise N 31, N 32, N 33, etc. The upstream nodes feeding the faulty nodes are traced back to fix the common node that may also connect to the downstream nodes fed by the faulty node. While tracing back in this scenario the common node that also connects to the downstream node N 31 may be N 11. There may be more than one alternate path also which may connect the upstream node to the downstream node.

FIG. 3D illustrates another exemplary network connectivity 330 around the faulty node. The node N 72 in the FIG. 3D may depict a faulty node. In order to identify a plurality of alternate paths based on at least one network connection between the one or more upstream nodes of the faulty node and the one or more downstream nodes of the faulty node, the upstream nodes feeding the faulty nodes are traced back to fix the common node that also connect to the downstream nodes fed by the faulty node. In this scenario, the common node may be N 52, as it is the common node that also connects to the downstream node N 81.

FIGS. 4A and 4B collectively represent a flow diagram of a detailed exemplary process for minimizing impact of faulty nodes on a rerouting system 104, in accordance with some embodiments of the present disclosure. With reference to FIG. 4, there is shown a flow chart 400. The flow chart 400 is described in conjunction with FIGS. 1 and 2.

At step 402, AI hardware accelerator 102 is deployed in real-time. The AI hardware accelerator 102 may include any hardware accelerator designed on artificial intelligence applications. In an example, the AI hardware accelerator 102 may be an autonomous vehicle. As an example, at step 402, the autonomous vehicle may start in real-time.

At step 404, the processor 202 in conjunction with the I/O interface 206 and the memory 204 may be configured to detect a faulty node associated with an artificial neural network in the AI hardware accelerator 102. The step 404 may be performed based on testing the artificial neural network periodically with a training dataset 208, wherein the faulty node causes a faulty path in the artificial neural network. The training dataset 208 is stored in the memory 204. The training dataset 208 may be stored outside the rerouting system 104 in the AI database 106. The training dataset 208 may have a predefined response stored in the AI database 106. The faulty node may be detected if a predefined response to the training dataset 208 is not received. Further, the faulty path may be rerouted if the faulty path is associated with one or more priority nodes.

At step 406, the processor 202 in configuration with priority map generator 210 may identify the one or more priority nodes. A subset of the relevance heat map 300 of the training dataset 208 may pass through the artificial neural network of the AI hardware accelerator 102 and may map the priority nodes based on the relevance heat map 300. The priority map 218 comprises the one or more priority nodes for the classification. The priority map 218 may be stored in the memory 204. The priority map 218 may be stored outside the rerouting system 104 in the AI database 106.

At step 408, the processor 202 determines if the faulty path is associated with one or more priority nodes. If the faulty path is associated with the one or more priority nodes, then control passes to step 410. If the faulty path is not associated with the one or more priority nodes, then control passes to step 404 and the rerouting system 104 may not reroute the faulty path, in such a case.

At step 410, the processor 202 in configuration with the impact table generator 212 may determine the impact of the one or more priority nodes on classification associated with the artificial neural network. The impact on the change in classification may be recorded in an impact table 220. The rerouting system 104 may set one or more weights associated with each priority node to zero successively and record a change in classification associated with each priority node. If the impact table 220 records a change in classification, then control passes to step 412. If there is no change in classification caused by deleting the one or more priority node, then control passes to step 404. Referring to FIG. 3B, considering Node N 01, there is a change in classification and hence the control may pass to step 412 in such a case. While considering Node N 02, there is no change in classification and hence the control passes to step 404.

At step 412, the processor 202 in configuration with the trace back unit 214 may identify a plurality of alternate paths. The plurality of alternate paths are identified based on at least one network connection between one or more upstream nodes of the faulty node and one or more downstream nodes of the faulty node.

At step 414, the processor 202 in configuration with the trace back unit 214 may assign one or more weights associated with the faulty node to one or more nodes associated with the plurality of alternate paths. The assignment of one or more weights may give the same activation at the downstream node to give the correct classification. The alternate path may rectify the change in classification and restore the relevance heat map 300 associated with the training dataset 208. After assigning the one or more weights associated with the faulty node, then control passes to step 416.

At step 416, the faulty path is rerouted in the neural network to perform the desired task correctly. The control passes to end step 418.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing network environment 100 for transmitting data over a communication network. Computer system 501 may include a central processing unit ("CPU" or "processor") 502. Processor 502 may include at least one data processor for executing program components for executing user- or system-generated requests. A user may include a person, a person using a device such as those included in this disclosure, or such a device itself. The processor 502 may include specialized processing units such as integrated system (bus) controllers, memory management control units, floating point units, graphics processing units, digital signal processing units, etc. The processor 502 may include a microprocessor, such as AMD ATHLON, DURON or OPTERON, ARM's application, embedded or secure processors, IBM POWERPC, INTEL'S CORE, ITANIUM, XEON, CELERON or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-VIDEO, VGA, IEEE 802.n/b/g/n/x, BLUETOOTH, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver 506 may facilitate various types of wireless transmission or reception. For example, the transceiver 506 may include an antenna operatively connected to a transceiver chip (e.g., TEXAS INSTRUMENTS WiLink WL1283, BROADCOM BCM4750IUB8, INFINEON TECHNOLOGIES X-GOLD 618-PMB9800, or the like), providing IEEE 802.11a/b/g/n, BLUETOOTH, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface 507 may employ connection protocols including, without limitation, direct connect, ETHERNET (e.g., twisted pair 10/100/1000 Base T), transmission control protocol/internet protocol (TCP/IP), token ring, IEEE 802.11a/big/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices 509, 510, and 511 may include, without limitation, personal compute (s), server(s), fax machines, printers, scanners, various mobile devices such as cellular telephones, smartphones (e.g., APPLE IPHONE, BLACKBERRY, ANDROID-based phones, etc.), tablet computers, eBook readers (AMAZON KINDLE, NOOK, etc.), laptop computers, notebooks, gaming consoles (MICROSOFT XBOX, NINTENDO DS, SONY PLAYSTATION, etc.), or the like. In some embodiments, the computer system 501 may itself embody one or more of these devices 509, 510, and 511.

In some embodiments, the processor 502 may be disposed in communication with one or more memory devices 515 (e.g., RAM 513, ROM 514, etc.) via a storage interface 512. The storage interface 512 may connect to memory devices 515 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 515 may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems 516 include, without limitation, APPLE MACINTOSH OS X, UNIX, UNIX-like system distributions (e.g., BERKELEY SOFTWARE DISTRIBUTION (BSD), FREE-BSD, NETBSD, OPENBSD, etc.), LINUX DISTRIBUTIONS (e.g., RED HAT. UBUNTU, KUBUNTU, etc.), IBM OS/2, MICROSOFT WINDOWS (XP), VISTA/7/8, 10 etc.), APPLE IOS, GOOGLE™ ANDROID™, BLACKBERRY OS, or the like. User interface 517 may facilitate display, execution, interaction, manipulation, or operation of program components through textual or graphical facilities. For example, user interfaces 517 may provide computer interaction interface elements on a display system operatively connected to the computer system 501, such as cursors, icons, check boxes, menus, scrollers, windows, widgets, etc. Graphical user interfaces (GUIs) may be employed, including, without limitation, APPLE MACINTOSH OPERATING SYSTEMS' AQUA, IBM OS/2, MICROSOFT WINDOWS (E.G., AERO, METRO, ETC.), WEB INTERFACE LIBRARIES (E.G., ACTIVEX, JAVA, JAVASCRIPT, AJAX, HTML, ADOBE FLASH, ETC.), OR THE LIKE.

In some embodiments, the computer system 501 may implement a web browser 518 stored program component. The web browser 518 may be a hypertext viewing application, such as MICROSOFT INTERNET EXPLORER, GOOGLE CHROME, MOZILLA FIREFOX, APPLE SAFARI, etc. Secure web browsing may be provided using HTTPS (secure hypertext transport protocol), secure sockets layer (SSL), Transport Layer Security (TLS), etc. Web browsers 518 may utilize facilities such as AJAX, DHTML, ADOBE FLASH, JAVASCRIPT, JAVA, application programming interfaces (APIs), etc. In some embodiments, the computer system 501 may implement a mail server 519 stored program component. The mail server 519 may be an Internet mail server such as Microsoft Exchange, or the like. The mail server 519 may utilize facilities such as ASP, ACTIVEX, ANSI C++/C#, MICROSOFT, .NET, CGI SCRIPTS, JAVA, JAVASCRIPT, PERL, PHP, PYTHON, WEBOBJECTS, etc. The mail server 519 may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client 520 may be a mail viewing application, such as APPLE MAIL, MICROSOFT ENTOURAGE, MICROSOFT OUTLOOK, MOZILLA THUNDERBIRD, and the like.

In some embodiments, computer system 501 may store user/application data 521, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as ORACLE or SYBASE. Alternatively, such databases may be implemented using standardized data structures, such as an array, hash, linked list, struct, structured text file (e.g., XML), table, or as object-oriented databases (e.g., using OBJECT-STORE, POET, ZOPE, etc.). Such databases may be consolidated or distributed, sometimes among the various computer systems discussed above in this disclosure. It is to be understood that the structure and operation of the any computer or database component may be combined, consolidated, or distributed in any working combination.

Additionally, as will be appreciated by those skilled in the art, the techniques described in various embodiments discussed above provide for rerouting around a faulty node in a neural network, thereby minimizing impact of the faulty node associated with the neural network. The technique may provide a workaround when a priority node fails on the hardware. The technique may further provide importance of a neuron in the neural network and the impact of deletion of a priority node on the output. Hence, the technique helps to prune the neural network retaining maximum classification accuracies and minimize the number of nodes.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of minimizing impact of a faulty node associated with an artificial neural network, the method comprising:

detecting, by a rerouting system, the faulty node associated with the artificial neural network based on testing the artificial neural network periodically with a training dataset, wherein the faulty node causes a faulty path in the artificial neural network;

identifying, by the rerouting system, a plurality of alternate paths to reroute the faulty path, wherein the plurality of alternate paths is identified based on at least one network connection between one or more upstream nodes of the faulty node and one or more downstream nodes of the faulty node; and rerouting, by the rerouting system, the faulty path by assigning one or more weights associated with the faulty node to one or more nodes associated with the plurality of alternate paths, wherein the faulty path is rerouted if the faulty path is associated with one or more priority nodes, wherein the one or more priority nodes are identified based on a relevance heat map associated with the training dataset, wherein the relevance heat map is generated through at least one of Layer-wise Relevance Propagation (LRP) and Sensitivity Analysis (SA).

2. The method as claimed in claim 1, wherein the faulty node is detected if a predefined response to the training dataset is not received.

3. The method as claimed in claim 1, wherein the faulty path is rerouted based on an impact of the one or more priority nodes on classification associated with the artificial neural network.

4. The method as claimed in claim 3, wherein the impact of the one or more priority nodes is determined by:
  setting, by the rerouting system, one or more weights associated with each priority node to zero successively; and
  recording, by the rerouting system, a change in classification associated with each priority node based on setting the one or more priority nodes to zero, wherein the change in classification relates to the impact of each priority node of the one or more priority nodes.

5. The method as claimed in claim 4, further comprises selecting an alternate path from the plurality of alternate paths to rectify the change in classification and restore the relevance heat map associated with the training dataset.

6. The method as claimed in claim 1, wherein the faulty node is associated with an artificial intelligence (AI) hardware accelerator.

7. A system for minimizing impact of a faulty node associated with an artificial neural network, the system comprising:
  a processor; and
  a memory communicatively coupled to the processor, wherein the memory stores processor executable instructions, which on execution causes the processor to:
  detect the faulty node associated with the artificial neural network based on testing the artificial neural network periodically with a training dataset, wherein the faulty node causes a faulty path in the artificial neural network;
  identify a plurality of alternate paths to reroute the faulty path, wherein the plurality of alternate paths is identified based on at least one network connection between one or more upstream nodes of the faulty node and one or more downstream nodes of the faulty node; and
  reroute the faulty path by assigning one or more weights associated with the faulty node to one or more nodes associated with the plurality of alternate paths, wherein the faulty path is rerouted if the faulty path is associated with one or more priority nodes, wherein the one or more priority nodes are identified based on a relevance heat map associated with the training dataset, wherein the relevance heat map is generated through at least one of Layer-wise Relevance Propagation (LRP) and Sensitivity Analysis (SA).

8. The system as claimed in claim 7, wherein the processor is configured to detect the faulty node if a predefined response to the training dataset is not received.

9. The system as claimed in claim 7, wherein the faulty path is rerouted based on an impact of the one or more priority nodes on classification associated with the artificial neural network.

10. The system as claimed in claim 9, wherein the impact of the one or more priority nodes is determined by:
  setting one or more weights associated with each priority node to zero successively; and
  recording a change in classification associated with each priority node based on setting the one or more priority nodes to zero, wherein the change in classification relates to the impact of each priority node of the one or more priority nodes.

11. The system as claimed in claim 10 further comprises selecting an alternate path from the plurality of alternate paths to rectify the change in classification and restore the relevance heat map associated with the training dataset.

12. The system as claimed in claim 7, wherein the faulty node is associated with an AI hardware accelerator.

13. A non-transitory computer-readable medium for minimizing impact of a faulty node associated with an artificial neural network, wherein upon execution of instructions by one or more processors, the one or more processors perform one or more operations comprising:
  detecting the faulty node associated with the artificial neural network based on testing the artificial neural network periodically with a training dataset, wherein the faulty node causes a faulty path in the artificial neural network;
  identifying a plurality of alternate paths to reroute the faulty path, wherein the plurality of alternate paths is identified based on at least one network connection between one or more upstream nodes of the faulty node and one or more downstream nodes of the faulty node; and
  rerouting the faulty path by assigning one or more weights associated with the faulty node to one or more nodes associated with the plurality of alternate paths, wherein the faulty path is rerouted if the faulty path is associated with one or more priority nodes, wherein the one or more priority nodes are identified based on a relevance heat map associated with the training dataset, wherein the relevance heat map is generated through at least one of Layer-wise Relevance Propagation (LRP) and Sensitivity Analysis (SA).

* * * * *